United States Patent Office  2,972,521
Patented Feb. 21, 1961

2,972,521
PRODUCTION OF PURE SILICON
Walter Voos, Gampel, Switzerland, assignor to Lonza Electric and Chemical Works Limited, Basel, Switzerland, a company of Switzerland
No Drawing. Filed Jan. 15, 1957, Ser. No. 634,352
Claims priority, application Switzerland Jan. 19, 1956
10 Claims. (Cl. 23—223.5)

This invention relates to a process for the production of pure silicon metal, and more particularly of silicon of a purity of at least 99.5 percent, for example 99.97 percent.

The known processes for producing pure metallic silicon by hydrometallurgical methods are, without exceptions, unsatisfactory, particularly because the treatment of crude silicon with acids is a cause for explosions. Due to the presence in crude silicon of silicides, especially the silicides of calcium and iron, the acid treatment generates not only hydrogen but also self-igniting silicon hydrides which may cause dangerous explosions when the work is done on a commercial scale. Various processes have been developed and suggested to overcome this grave drawback, but all the suggested processes are complicated and expensive and increase the cost of the product substantially.

There has not been any commercial process so far which would permit the production of silicon of a very high purity in a plant having low first costs and low operating costs.

My present invention aims at silicon with a silicon content of not less than 99.5 percent, for instance, 99.97 percent, and as high as 99.99 percent.

The primary object of my invention is to provide a simple and inexpensive process that will obviate the possibility of explosions, otherwise existent, even when large quantities of material are handled and will thus be particularly suitable for commercial processing on a large scale.

An additional object of the invention is to provide a hydrometallurgical digesting process.

Another object of this invention is to start from crude silicon with a content of approximately 96 to 98% Si as a raw material. The crude metal is obtained in metallurgical plants.

Further objects of this invention will become apparent from the following description.

To prepare the crude metal for the digestion, it is first comminuted to a particle size of approximately 3 mm. and then pulverized to pass through a screen with a mesh aperture of 0.075 mm.

The process of the invention consists basically in two successive sections of treatments, namely, (1) An acid digestion and
(2) Leaching in heaps.

In the first section, the pulverized crude silicon metal is leached, broadly speaking, with acid. Suitable acids are hydrochloric acid or sulfuric acid, or mixtures of the two acids. This may be followed by a stronger acid digestion, using hydrofluoric acid. In order to avoid any danger of explosion during the acid treatment with hydrochloric acid, sulfuric acid, or a mixture of these acids, the acids are sprayed in finely dispersed form on the metal powder while the latter is actively stirred and turned over. During this procedure, a pasty mass is formed gradually.

In the second section, the pasty mass is subjected to heap-leaching for at least a day, that is, the mass is left to stand in heaps without any mechanical treatment. The pure high-grade silicon is then separated by washing and drying.

The individual operating steps are performed as follows:

The leaching of the metal powder is done with dilute hydrochloric acid, dilute sulfuric acid, or a mixture of these two acids. I prefer to use dilute hydrochloric acid.

The concentration of the dilute acid should be such as to be capable of extracting all secondary constituent metals, such as Fe, Al, Ca, Mg, Mn, Ti, as far as they are at all soluble in dilute hydrochloric acid, dilute sulfuric acid, or mixtures thereof.

When dilute hydrochloric acid is used, I prefer a concentration of 200 g./l. HCl. Such concentration may readily be prepared by diluting a concentrated acid having an HCl content of 400 g./l. with water at a ratio of 1:1.

The way of adding the dilute acid is of importance. The entire amount of acid must not be added at once since self-igniting silicon hydrides generate simultaneously with hydrogen, which hydrides, however, are, as has already been stated, the cause of dangerous explosions. The greatest care is necessary in this respect when pure silicon is to be prepared on a large scale.

According to the invention, the dilute acid, finely dispersed, for example, in droplets or in fine streams, is sprayed on the finely pulverized crude silicon metal while the crude metal is actively mixed at the same time, for example, by stirring, or turning over, or simultaneous stirring and turning over.

By mixing in this way, crude silicon which has been freshly sprayed with dilute acid will immediately be covered by other material and turned over.

To promote intimate distribution of the dilute acid throughout the crude silicon that is to be wetted, it may be convenient to add the dilute acid in several portions. The explosion danger may be avoided by adding smaller amounts at intervals or by the addition of finely dispersed acid, for instance, in form of droplets or fine streams.

When the dilute acid is minutely dispersed, for instance, as a fog of liquid droplets, while being added, and the crude silicon metal is at the same time strongly mixed, the dilute acid may be added continuously. In this manner, the crude metal is gradually wetted and saturated.

The extraction of metal impurities in the first section of operating steps causes a concentration of the silicon content.

It is essential to add only enough dilute acid to form a mass of dough-like consistency. Larger amounts of liquid, which would form a suspension, are to be avoided since this would interfere with the subsequent heap-leaching. Relative to the crude metal, the silicon content of which is generally between 96 and 98%, approximately 30–70%, and preferably 50–60%, dilute hydrochloric acid, or corresponding amounts of sulfuric acid or of a mixture of both acids are required. This means that the digestion of 1,000 kg. crude metal will require, for example, 600 l. dilute hydrochloric acid with an HCl content of 120 kg. I prefer to add at first only 80% of these 600 l. to each 1,000 kg. of crude metal while mixing vigorously. After this, the mass, so to speak, has become immune, and explosions are no longer to be feared. The remaining 20% or 120 l. of the dilute acid may be added, without special precautionary measures, in stronger continuous streams while the mass is mixed.

The doughlike mass, in the second section, is subjected to heap-leaching after the entire amount of dilute acid has been stirred in. The heaps are left to rest without stirring or any other mechanical treatment. Heap-leaching generally requires a rest of at least 24 hours. I prefer a resting period of approximately three days.

An extension of the freedom from any movement substantially beyond this limit generally offers no advantages.

After the heap-leaching with dilute acid has been concluded, the pure silicon is obtained in a known manner by washing and drying.

The process as described hereinbefore is suitable for refining crude silicon which contains only small amounts of not readily extractable silicides, such as iron silicide (like $FeSi_2$ and $FeSi_3$). It permits the preparation of pure silicon with Si-contents of 99.5 to 99.7%.

When silicon of a higher degree of purity, for example, of over 99.7% up to 99.994%, is to be produced, an additional treatment of the dilute acid-digested material with hydrofluoric acid is necessary. The latter is capable of dissolving or decomposing iron silicides, such as $FeSi_2$.

For combined leaching operations with dilute hydrochloric acid, dilute sulfuric acid, or mixtures thereof, on the one hand, and with hydrofluoric acid, on the other hand, the material which has been formed with dilute acid into a dough, as has been described above, is immediately mixed with hydrofluoric acid under continuous agitation.

The concentration of the hydrofluoric acid depends on the desired degree of purity and the amount of silicides to be decomposed. Hydrofluoric acid with an HF content up to 30% may be used in this combined leaching operation. For instance, a doughlike mass obtained from 1,000 kg. crude silicon metal powder and 600 l. dilute acid, such as hydrochloric acid diluted with water at a ratio of 1:1, may be treated for further purification, immediately after the formation of the dough, with 392 l. of a hydrofluoric acid solution containing 326 g./l. HF. The HF-content of the liquid phase is, therefore, 127.8 g./l. While the hydrofluoric acid is added, the mass is continuously stirred, and after this addition, the mass is subjected to leaching in heaps, for example, for three days.

If the purity of the material is to satisfy particularly high requirements and a metal of a purity in excess of 99.99 percent is to be prepared, the combined leaching operations and the subsequent heap-leaching have to be repeated once or several times. Since the danger of explosions has been eliminated by the first treatment with dilute acid, the repeated acid treatments may be carried out with combined liquors. For example, a mixture of hydrochloric and hydrofluoric acid may be used in the repeated acid treatment steps.

The acid treatment may be performed in various manners, for instance, by leaching with agitation in open containers, or centrifugal leaching, for example, in a Pachuca tank suitably lined with acid-resistant material, or by pressure-leaching in an autoclave. The heap-leaching is preferably done in the same container by stopping the agitating device.

It will be understood that it is essential to carry out the acid treatment under the above described conditions and to combine the acid treatment with subsequent heap-leaching.

After the heap-leaching, the mass is washed in a known manner and separated from the acid liquor, that is, de-acidified, for example, by selective washing, centrifuging, settling and decanting. These operations have to be performed most carefully. The washing operation is not simple because a metal skeleton, that is, a metallic mass of spongy metal grains permeated by fine pores, is formed by the acid digestion and the heap-leaching. The metal grains are difficult to wash out since they do not readily yield the impurities. The separated liquors may be re-used after suitable purification. The drying of the purified silicon powder is done, for example, in centrifugal driers or in rotating drum driers at temperatures of 70–80° C., and preferably at 72–73° C., in a non-oxidizing atmosphere.

If it is desired to refine a carbide-containing crude silicon, it can be decarburized before the acid treatment, for example, by heat-treatment, in the absence of air, together with metals or metal compounds which combine with carbon.

The following examples and tables are given to illustrate the present invention without, however, limiting its scope.

EXAMPLE 10,000 kg. crude silicon containing 98.947% Si and pulverized to pass through a 0.075 mm. mesh screen are placed in a container equipped with a mixing device. The metal powder which lies on the bottom of the container is continuously and intensely plowed and turned over. While this agitation continues, approximately 80% (4,800 l.) of the total amount of the acid required for the digestion (6,000 l. of a dilute hydrochloric acid prepared by mixing equal parts of concentrated hydrochloric acid and water) are slowly stirred in. The acid is added at intervals from a spray nozzle or in drops whereby the metal powder is gradually formed into a dough-like mass. The overturning is performed so that material freshly sprayed with the dilute acid will immediately be covered by turned-over material and will be included into the turning mass. This makes for a gradual and uniform formation of a pasty mass and safely prevents explosions. It should be noted that particular caution is required at the start of the mixing operation. Once the metal powder is uniformly wetted with the added acid, the grain is immune. The remainder of the dilute hydrochloric acid (approximately 20% of the total or 1,200 l.) may then be added in an uninterrupted stream while the mass is agitated and turned over. There is no further danger of explosions.

Next, heap-leaching follows whereby the material treated with the dilute hydrochloric acid is permitted to rest in the container for three days without any further treatment.

The resulting metal powder paste is now separated from the liquor by thorough and repeated washing and subsequent decanting and then dried in a rotating drum drier at approximately 72–73° C.

About 9,800 kg. of 99.501% Si are obtained.

All percentage data in the description and in the claims are to be understood as percent by weight.

The results of several additional digestion runs are shown in the tables below.

Where the tables refer to g. HCl or g. HF, they indicate weight of pure hydrogen chloride or hydrogen fluoride contained in the respective acids.

Table 1

[Digestion with dilute hydrochloric acid only, followed by heap-leaching]

| Raw Material, Percent Si | g. HCl per kg. Metal | Finished Product, Percent Si |
|---|---|---|
| 99.201 | 90 | 99.501 |
| 99.201 | 100 | 99.558 |
| 99.201 | 110 | 99.57 |
| 99.124 | 180 | 99.508 |
| 99.124 | 200 | 99.528 |
| 98.947 | 100 | 99.563 |

Table 2

[Digestion with dilute hydrochloric acid, leaching with the addition of dilute hydrofluoric acid (that is, HCl+HF), and subsequent heap-leaching for three days]

| Raw Material, Percent Si | g. HCl+g. HF per kg. Metal | Finished Product, Percent Si |
|---|---|---|
| 99.018 | 90 g.+30 g. | 99.8593 |
| 98.776 | 100 g.+16.3 g. | 99.7561 |
| 98.716 | 90 g.+2.3 g. | 99.7176 |
| 98.776 | 100 g.+26 g. | 99.7971 |
| 98.947 | 80 g.+81.5 g. | 99.9773 |
| 98.137 | 100 g.+63.9 g. | 99.9662 |
| 98.947 | 120 g.+120.6 g. | 99.9822 |

Table 3

[Same treatment as for Table 2, but digestion with HCl+HF and heap leaching is repeated twice]

| Raw Material, Percent Si | g. HCl+g. HF per kg. Metal | Finished Product, Percent Si |
|---|---|---|
| 99.007 | 90 g.+90 g. | 99.9864 |
| 98.767 | 90 g.+82.2 g. | 99.9794 |
| 96.646 | 110 g.+109.5 g. | 99.7515 |

Table 4

[Same treatment as for Table 2, but digestion with HCl+HF and heap-leaching is repeated four times]

| Raw Material, Percent Si | g. HCl+g. HF per kg. Metal | Finished Product, Percent Si |
|---|---|---|
| 98.8 | 120 g.+127.8 g. | 99.994 |

FLOW SHEET (1) Crude silicon metal

(2) Grinding to fine powder

(3) Digestion by finely dispersed dilute acid (HCl or H₂SO₄ or both) and mixing of mass to form a paste

   →   (4) Combined leaching with dilute hydrochloric and/or sulfuric acid and hydrofluoric acid

(5) Heap-leaching by allowing the paste to rest without mechanical agitation for at least one day and preferably three days

   (6) Single or multiple repetition of acid treatment and subsequent heap-leaching

(7) Washing and drying

   ↘ Silicon over 99.7 and up to 99.994%

Silicon 99.5 to 99.7%

It is believed that the general method and the specific examples of my invention, as well as the advantages thereof, will be apparent from the foregoing description. It will also be apparent that while I have shown and described preferred examples of my invention, changes may be made without departing from the spirit of the invention, as sought to be defined in the following claims.

I claim:

1. Process for the production on a commercial scale of pure silicon with a content of at least 99.5% Si from crude silicon having a silicon content in the order of magnitude of 96 to 98%, comprising pulverizing the crude silicon so that it will pass through a screen of 0.075 mm. opening, applying acid to the pulverized silicon over a prolonged period of time and in no larger quantity than is needed for the resultant mixture of the pulverized silicon and acid to be of a doughlike consistency, the acid being selected from a group consisting of dilute hydrochloric acid, dilute sulfuric acid, and a mixture of said acids, vigorously working the pulverized silicon while the acid is added, thereby covering portions of the silicon, which have been freshly treated with acid, with such other portions as have not recently been contacted by acid, further turning over the treated silicon, and forming a doughy mass, subjecting the dough to heap-leaching by allowing the dough to stand in heaps without being moved for at least one day, and isolating the pure silicon by washing and drying.

2. The process as set forth in claim 1, wherein the dilute acid is intermittently added in portions.

3. The process as set forth in claim 1, wherein the dilute acid is continuously added as a fine spray.

4. The process as set forth in claim 1, wherein not more than substantially 80% of the total amount of the dilute acid to be used are added in finely dispersed form, and the remainder of the acid is added rapidly, with the pulverized crude metal being continuously mixed.

5. In the process as set forth in claim 1, the steps of adding hydrofluoric acid to the pasty mass after complete addition of the dilute acid and before heap-leaching, and continuously agitating the pasty mass while subjecting same to the hydrofluoric leaching action.

6. In the process as set forth in claim 5, repeating at least twice the cycle of the first named leaching, the second named leaching, and the heap-leaching.

7. In the process as set forth in claim 6, simultaneously carrying out the first and second named leachings with a mixture of said dilute acid and hydrofluoric acid.

8. The process according to claim 1, wherein the acid is added in an amount of approximately 30 to 70%, calculated as dilute hydrochloric acid.

9. In the process as set forth in claim 1, the steps of adding hydrofluoric acid to the pasty mass after the leaching with the dilute acid and before heap-leaching, and continuously agitating the pasty mass while subjecting same to the hydrofluoric leaching action.

10. In the process as set forth in claim 1, said acid being applied in a concentration approximating that of 200 g./l. HCl.

References Cited in the file of this patent

UNITED STATES PATENTS

| 1,386,227 | Becket | Aug. 2, 1921 |
| 1,928,728 | Keyes | Oct. 3, 1933 |

FOREIGN PATENTS

| 488,244 | Great Britain | July 4, 1938 |